US012146451B2

(12) United States Patent
Carey et al.

(10) Patent No.: US 12,146,451 B2
(45) Date of Patent: Nov. 19, 2024

(54) METHODS FOR MEASURING FUEL QUANTITY DURING MULTIPULSE FUEL INJECTION EVENTS IN A COMMON RAIL FUEL SYSTEM

(71) Applicant: Cummins Inc., Columbus, IN (US)

(72) Inventors: David Michael Carey, Bend, OR (US); Sanjay Manglam, Franklin, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/513,778

(22) Filed: Nov. 20, 2023

(65) Prior Publication Data

US 2024/0084757 A1 Mar. 14, 2024

Related U.S. Application Data

(63) Continuation of application No. 17/790,430, filed as application No. PCT/US2020/067416 on Dec. 30, 2020, now Pat. No. 11,852,097.

(51) Int. Cl.
*F02D 41/40* (2006.01)
*F02D 41/20* (2006.01)
(Continued)

(52) U.S. Cl.
CPC .......... *F02D 41/403* (2013.01); *F02D 41/20* (2013.01); *F02D 41/3818* (2013.01);
(Continued)

(58) Field of Classification Search
CPC .... F02D 41/402; F02D 41/403; F02D 41/405; F02D 2041/224; F02D 2200/0602;
(Continued)

(56) References Cited

U.S. PATENT DOCUMENTS 5,402,760 A 4/1995 Takeuchi et al.
6,588,398 B1 7/2003 Rodier
(Continued)

FOREIGN PATENT DOCUMENTS

GB 2404746 2/2005

OTHER PUBLICATIONS

International Search Report and Written Opinion for International patent application No. PCTUS2067416, filed Dec. 30, 2020, mailed Mar. 19, 2021, 5 pgs.

*Primary Examiner* — Erick R Solis
(74) *Attorney, Agent, or Firm* — Taft, Stettinius & Hollister LLP

(57) ABSTRACT

Various embodiments of the present disclosure relate to methods and systems for measuring an injected fuel quantity during multipulse injection events in a common rail of a fuel system including a fuel pump to supply fuel to the common rail. The method, using a control unit, determines if each of the multipulse injection events in a normal operating condition includes a pilot pulse; in response to determining that the pilot pulse is included, obtaining an enforced separation value between the pilot pulse and the main pulse to emulate a single-pulse injection; while the fuel pump is temporarily shut off, performing a temporary enforced separation on a fraction of the multipulse injection events; measuring a pressure change in the common rail during the temporary enforced separation; and resuming the normal operating condition of the multipulse injection events after the pressure change is measured.

20 Claims, 6 Drawing Sheets

(51) Int. Cl.

| | |
|---|---|
| ***F02D 41/38*** | (2006.01) |
| ***F02M 65/00*** | (2006.01) |
| *F02D 41/22* | (2006.01) |

(52) U.S. Cl.
CPC ......... *F02D 41/402* (2013.01); *F02D 41/405* (2013.01); *F02M 65/001* (2013.01); *F02M 65/003* (2013.01); *F02D 2041/224* (2013.01); *F02D 2200/0602* (2013.01); *F02D 2200/0612* (2013.01); *F02D 2200/0614* (2013.01)

(58) Field of Classification Search
CPC ..... F02D 2200/0612; F02D 2200/0614; F02D 2200/0616; F02M 65/001; F02M 65/003
USPC .......................... 73/114.48; 123/299, 114.51
See application file for complete search history.

(56) References Cited

U.S. PATENT DOCUMENTS

| | | | | |
|---|---|---|---|---|
| 6,990,855 | B2 | 1/2006 | Tuken et al. | |
| 7,706,957 | B2 | 4/2010 | Yamada et al. | |
| 8,607,549 | B2 | 12/2013 | Kong et al. | |
| 9,909,524 | B2 | 3/2018 | Golz et al. | |
| 10,094,320 | B2 | 10/2018 | Sanborn et al. | |
| 10,487,768 | B2 | 11/2019 | Merlino et al. | |
| 10,900,436 | B2 | 1/2021 | Dykstra et al. | |
| 2004/0134268 | A1 | 7/2004 | Tuken et al. | |
| 2009/0063017 | A1 | 3/2009 | Yamada et al. | |
| 2009/0326788 | A1 | 12/2009 | Yuasa et al. | |
| 2015/0233318 | A1 | 8/2015 | Nieddu | |
| 2016/0208727 | A1 | 7/2016 | Ito et al. | |
| 2018/0334983 | A1 | 11/2018 | Merlino et al. | |
| 2022/0213845 | A1 * | 7/2022 | Jung | F02D 41/1402 |

* cited by examiner

100

600

METHODS FOR MEASURING FUEL QUANTITY DURING MULTIPULSE FUEL INJECTION EVENTS IN A COMMON RAIL FUEL SYSTEM

CROSS REFERENCE

The present application is a continuation of U.S. application Ser. No. 17/790,430 filed Jun. 30, 2022 which claims priority to and the benefit of International Patent Application No. PCT/US2020/067416, filed Dec. 30, 2020, the entire contents of which are incorporated herein by reference.

FIELD OF THE DISCLOSURE

The present disclosure generally relates to fuel injectors, particularly high pressure fuel injectors in a common rail fuel system.

BACKGROUND OF THE DISCLOSURE

Fuel injectors are commonly used to control the flow of fuel into each cylinder of an internal combustion engine. The fuel injector is generally designed to move a valve to open a port to thereby spray a quantity of fuel into a corresponding cylinder, and then move the valve to close the port to stop the spray of fuel. Certain fuel injection systems are configured to spray fuel into the cylinder in multiple shots within a single cycle of the engine, instead of a single shot per cycle, which may be referred to as multipulse fuel injection. Typically, multipulse fuel injection include a small "pilot" injection that is commanded immediately preceding a larger "main" injection (providing most of the torque production), which reduces combustion noise by slowing the increase in cylinder pressure and achieve desired combustion and/or emissions performance.

Modern combustion strategies require accurate and repeatable injection performance that is difficult to achieve, even with precision manufacturing, and that typically changes over the life of the engine due to wear and other aging effects. Accordingly, there remains a need for further contributions in this area of technology. Aspects of the invention disclosed herein provide for better and more efficient measurement of such injection events.

SUMMARY OF THE DISCLOSURE

Various embodiments of the present disclosure relate to methods and systems for measuring an injected fuel quantity during multipulse injection events in a common rail of a fuel system including a fuel pump to supply fuel to the common rail. The method includes: determining, by a control unit, if each of the multipulse injection events in a normal operating condition includes a pilot pulse, the pilot pulse being defined as injecting less fuel than a main pulse of the each of the multipulse injection events; in response to determining that the pilot pulse is included, obtaining, by the control unit from a memory unit, an enforced separation value between the pilot pulse and the main pulse to emulate a single-pulse injection; while the fuel pump is temporarily shut off, performing, by the control unit based on the enforced separation value, a temporary enforced separation on a fraction of the multipulse injection events; measuring, by the control unit, a pressure change in the common rail during the temporary enforced separation; and resuming, by the control unit, the normal operating condition of the multipulse injection events after the pressure change is measured.

In some examples, the fraction of the multipulse injection events includes one multipulse injection event in every 1000 or more multipulse injection events. In some examples, the method includes: obtaining, by the control unit, an injection drain quantity of the pilot pulse and the main pulse in the common rail; and calculating, by the control unit, the injected fuel quantity based on the pressure change in the common rail and the injection drain quantity.

In some examples, the method includes: in response to determining that the pilot pulse is included, determining, by the control unit, if the each of the multipulse injection events in the normal operating condition further includes a post pulse, the post pulse being defined as injecting less fuel than the main pulse; in response to determining that the pilot and post pulses are included, determining, by the control unit, to temporarily omit the post pulse in addition to the temporary enforced separation on the fraction of the multipulse injection events; and measuring, by the control unit, the pressure change in the common rail during the temporary omission of the post pulse and the temporary enforced separation. In some aspects of these examples, the method further includes temporarily increasing, by the control unit, an amount of fuel injected by the main pulse to compensate for the temporary omission of the post pulse.

In some examples, the method includes: in response to determining that the pilot pulse is not included, determining, by the control unit, to temporarily omit a post pulse in the fraction of the multipulse injection events, the post pulse being defined as injecting less fuel than the main pulse; and measuring, by the control unit, the pressure change in the common rail during the temporary omission of the post pulse. In some aspects of these examples, the method further includes temporarily increasing, by the control unit, an amount of fuel injected by the main pulse to compensate for the temporary omission of the post pulse. In some examples, the enforced separation value is predetermined and obtainable from a lookup table stored in the memory unit of the control unit.

The system includes a fuel pump; a common rail fluidly coupled with the fuel pump to receive fuel supplied therefrom; a plurality of fuel injectors fluidly coupled with the common rail and configured to inject the fuel supplied by the fuel pump and a control system comprising a processing unit operatively coupled to the plurality of fuel injectors, the processing unit further comprising a memory unit operatively coupled thereto. The processing unit is configured to: determine if each of a plurality of multipulse injection events in a normal operating condition includes a pilot pulse, the pilot pulse being defined as injecting less fuel than a main pulse of the each of the multipulse injection events; in response to determining that the pilot pulse is included, obtain an enforced separation value between the pilot pulse and the main pulse to emulate a single-pulse injection; while the fuel pump is temporarily shut off, perform a temporary enforced separation on a fraction of the multipulse injection events based on the enforced separation value; measure a pressure change in the common rail during the temporary enforced separation; and enable the fuel pump and resume the normal operating condition of the multipulse injection events after the pressure change is measured.

In some examples, the fraction of the multipulse injection events includes one multipulse injection event in every 1000 or more multipulse injection events. In some examples, the processing unit is further configured to: obtain an injection drain quantity of the pilot pulse and the main pulse in the common rail; and calculate the injected fuel quantity based on the pressure change in the common rail and the injection drain quantity.

In some examples, the processing unit is further configured to: in response to determining that the pilot pulse is included, determine if the each of the multipulse injection events in the normal operating condition further includes a post pulse, the post pulse being defined as injecting less fuel than the main pulse; in response to determining that the pilot and post pulses are included, determine to temporarily omit the post pulse in addition to the temporary enforced separation on the fraction of the multipulse injection events; and measure the pressure change in the common rail during the temporary omission of the post pulse and the temporary enforced separation. In some aspects of the examples, the processing unit is further configured to: temporarily increase an amount of fuel injected by the main pulse to compensate for the temporary omission of the post pulse.

In some examples, the processing unit is further configured to: in response to determining that the pilot pulse is not included, determine to temporarily omit a post pulse in the fraction of the multipulse injection events, the post pulse being defined as injecting less fuel than the main pulse; and measure the pressure change in the common rail during the temporary omission of the post pulse. In some aspects of the examples, the processing unit is further configured to: temporarily increase an amount of fuel injected by the main pulse to compensate for the temporary omission of the post pulse.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

Figure 1:
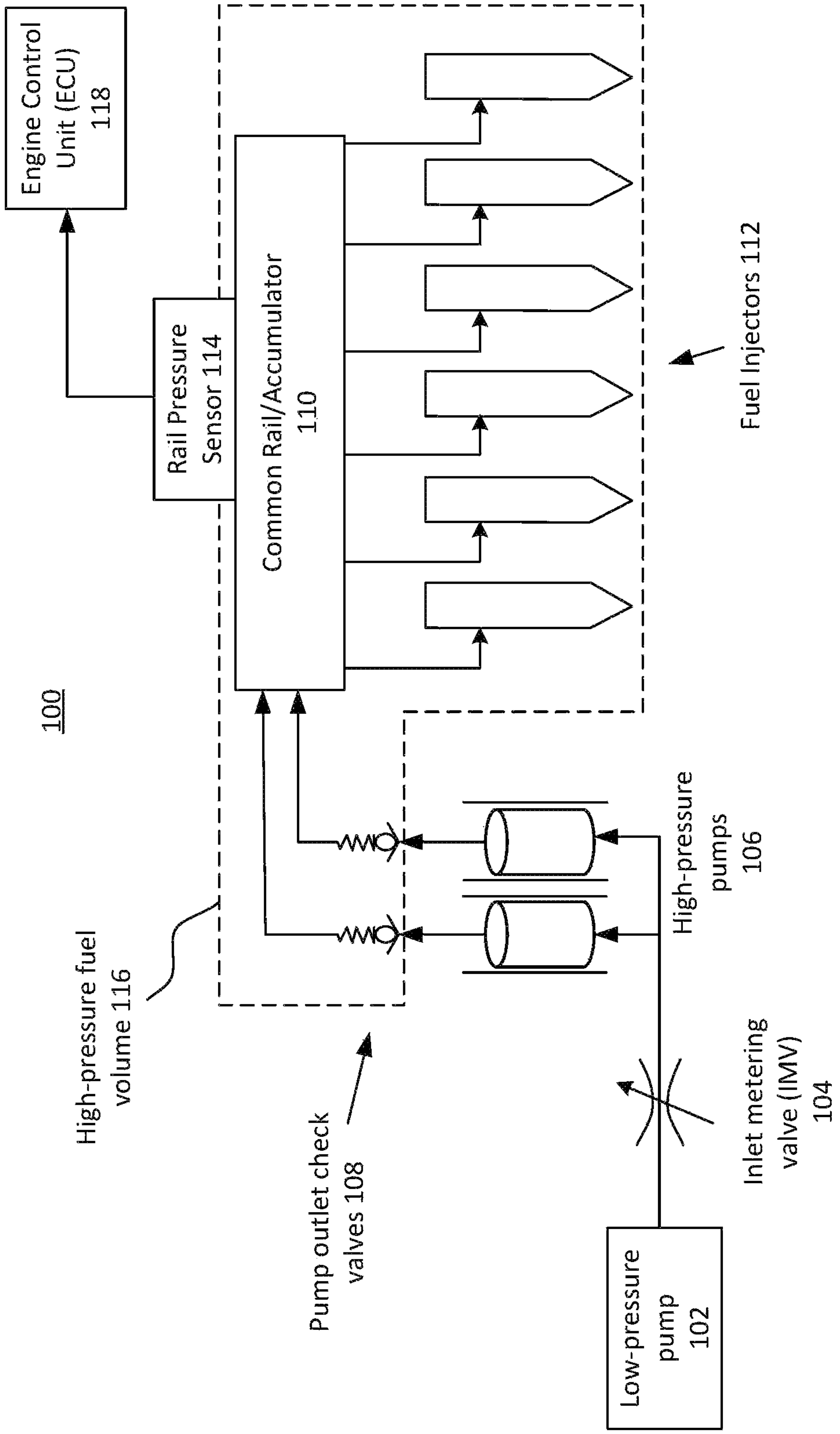
FIG. 1 is a schematic diagram of a common rail fuel system according to embodiments disclosed herein.

Corresponding reference characters indicate corresponding parts throughout the several views. Although the drawings represent embodiments of the present invention, the drawings are not necessarily to scale, and certain features may be exaggerated to better illustrate and explain the present invention.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to “one embodiment,” “an embodiment,” or similar language means that a particular feature, structure, or characteristic described in connection with the embodiment is included in at least one embodiment of the present disclosure. Appearances of the phrases “in one embodiment,” “in an embodiment,” and similar language throughout this specification may, but do not necessarily, all refer to the same embodiment. Similarly, the use of the term “implementation” means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

To compensate for variation in the injector performance, methods have been developed to measure injected quantity during engine operation and continuously adapt a learned injection characteristic for each individual injector, thereby providing accurate injection quantity control over the life of the engine. However, fuel quantity measurements during multipulse injection are complicated by the fact that injection pulses at a given on-time command inject varying amounts of fuel depending on where they occur in the multipulse sequence.

While a single injection pulse (and the first pulse in a multipulse sequence) initiates during quiescent conditions in the injector and rail, a pulse in the middle of a multipulse sequence initiates during pressure conditions inside the injector that are oscillating significantly due to a preceding pulse. Depending on the injector design, there may be other non-quiescent conditions in the injector that affect subsequent injections, particularly if the time separation between pulses is relatively short. Thus, injection performance is susceptible not only to manufacturing variation and aging, but also to the proximity of preceding injection pulses.

Moreover, the existence and proximity of other pulses is typically governed by a combustion strategy that is highly variable and transient, and dependent on numerous other subsystem and environmental conditions.

Due to the variability and transient nature of operating conditions of the engine, it is not possible to simply measure the fueling of each pulse and apply a feedback control loop to maintain accuracy. It is necessary to adapt a model of the injector characteristic so that it can be used to control injected quantity, with good accuracy, in highly transient conditions (with regard to torque demand, engine speed, and other inputs at the fuel system level). An injection characteristic model representing single-pulse operation is needed, at least for the first pulse in any multipulse sequence.

In many applications, single-pulse operation is still used in some operating regimes (usually high load) and there are multipulse sequences in which the first pulse is relatively large. For these reasons, it is necessary, in every application, to adapt a single-pulse injection characteristic model over the entire fueling range of the injector.

Embodiments and examples in this disclosure provide methods and systems for measuring injection quantities that are representative of a single-pulse injection during multipulse operation. Doing so enables successful compensation of injector fueling variation in engine systems that operate predominantly in multipulse mode.

The embodiments and examples may be implemented in an fuel system that includes a rail (also referred to as a "common rail"), a plurality of fuel injectors fluidly coupled to the rail, and a control system coupled to the fuel injectors. The control system may include sensors and a processing unit that receives the measurements taken by the sensors to perform calculations and determinations as further explained herein. The sensors may be any suitable sensors that can measure the quantity variation such as the fueling interaction between pulses. The processing unit, which many be any suitable processor such as a central processing unit, system-on-a-chip, or integrated circuit in any suitable computing device. The processing unit performs the measuring of the injection quantities, as well as controlling the operation of the fuel pumps and injectors to achieve the injection measurement disclosed herein.

Figure 2:
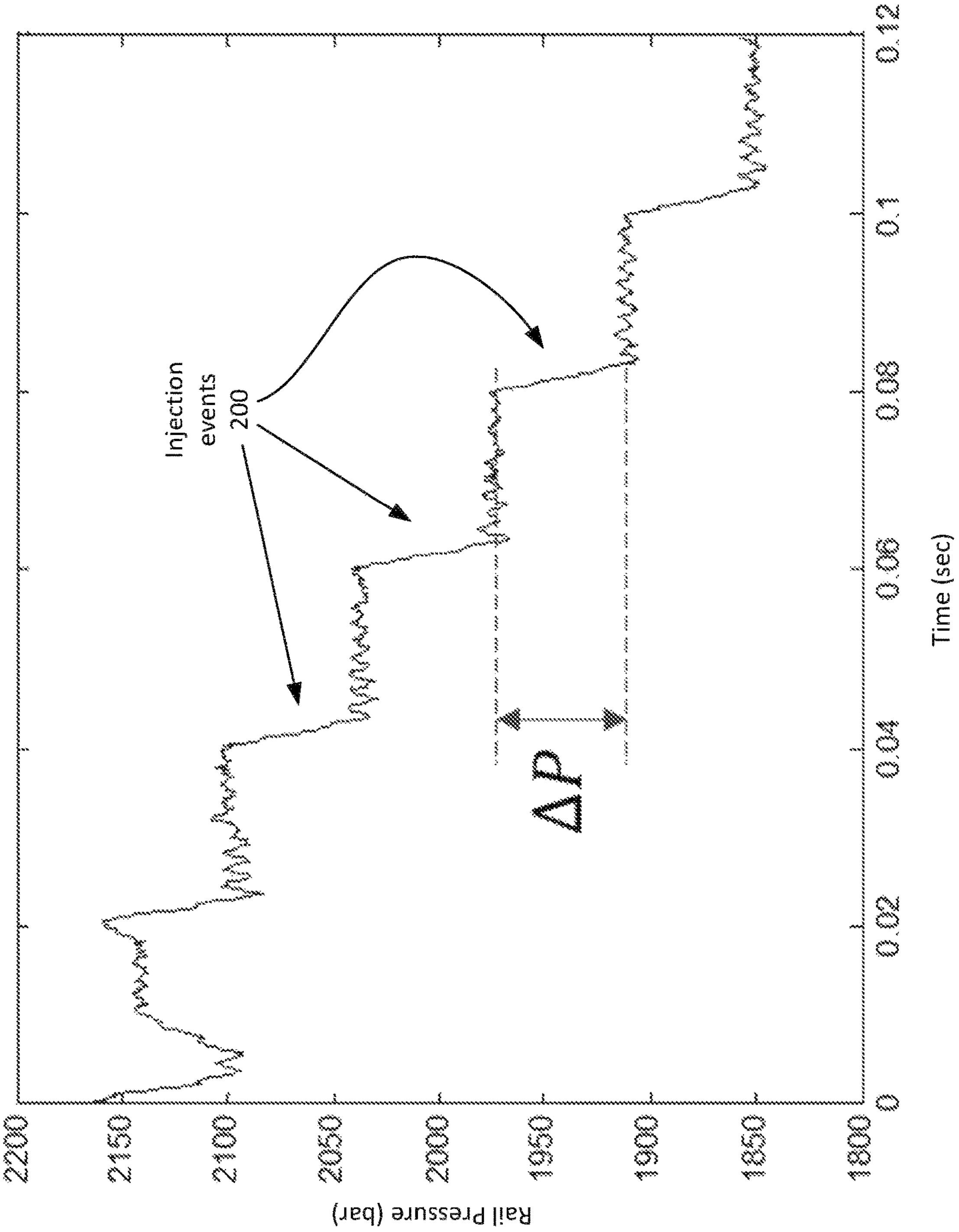
FIG. 2 (Prior Art)
FIG. 2 is a rail pressure graph during injection events showing pressure drops measured during single-pulse injection events by shutting off the pumps, as known in the art.

FIG. 1 illustrates a common rail fuel system 100, and FIG. 2 illustrates a known method for online measurement of moderate-to-high single-pulse fueling quantities in the fuel system 100. The known method involves shutting off the pump for a predetermined period of time (e.g., for about 100 milliseconds) and measuring the drop in rail pressure (ΔP) due to each individual injection. The fuel system 100 includes a low pressure pump 102 which pumps fuel through an inlet metering valve (IMV) 104 into high-pressure pumps 106. In the known method of FIG. 2, the IMV 104 closes completely to prevent fuel to flow into a common rail 110. Pump outlet check valves 108 may be operated by an engine control unit (ECU) 118 to control the amount of fuel flowing into the common rail 110 as well. Downstream of the valves 108 is a fixed, pressurized high-pressure fuel volume 116 which includes the common rail/accumulator 110 and a plurality of fuel injectors 112.

In the method of FIG. 2, shutting off the pump 106 is necessary to remove a significant unknown in the equation for conservation of mass. Each pressure drop measurement is converted to a total fuel mass removed from the pressurized volume using an estimated sonic speed of the fuel and the known, constant pressurized volume 116 of the common rail system (rail, lines, and injector bodies). The total fuel removed from the common rail 110 with each injection (comprised of fuel injected into the cylinder and a smaller amount of fuel that flows to a drain) is then converted to an injected quantity using an open-loop model for the relationship between injected quantity and drain quantity. These injected quantity measurements, along with the associated injector on-time and mean pressure of injection, are fed to an adaption algorithm to estimate the injection characteristic (i.e., injected quantity versus on-time and pressure) for each individual injector.

In FIG. 2, each common rail pressure drop (ΔP) is caused by an injection event 200, and the amount of ΔP is directly proportional to the injected fuel quantity. More specifically, the injected quantity ($Q_{injected}$) is calculated using the following equation:

$$Q_{injected} = \frac{V}{c^2}\Delta P - Q_{drain} \quad \text{(Equation 1)}$$

where V is the value of the total pressurized volume 116 which is constant, c is the effective sonic speed which is a function of pressure and temperature of the system, and $Q_{drain}$ is the injection drain quantity which is a function of the injected quantity ($Q_{injected}$) and pressure of the system.

When the cylinder event involves multipulse injections (also referred to as "multiple injection pulses"), each pulse represents an additional unknown in the equation for conservation of mass. However, there is effectively just one equation, i.e., the pressure drop that gives the total fuel removed from the pressurized volume due to the combined effect of all pulses, since there is insufficient settling time between pulses to measure the individual pressure drop due to each pulse. Moreover, all following pulses are vulnerable to the disturbances created by preceding pulses. As such, even if it were possible to measure the pressure drops due to each individual pulse, there would still be unknown pulse interaction effects contaminating the injected quantity calculations.

Figure 3:
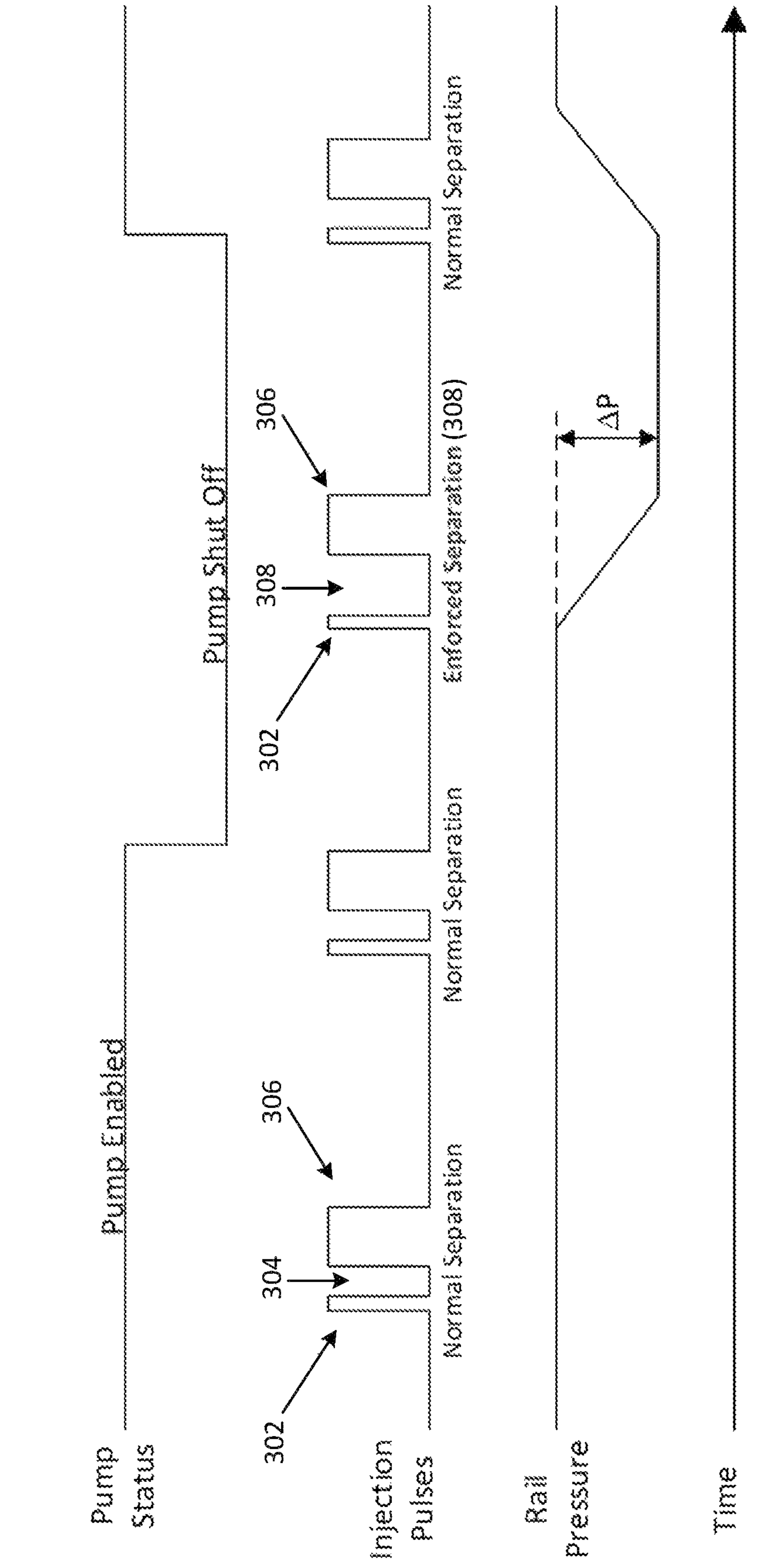
FIG. 3 shows the relationship between pump status, injection pulses, and rail pressure during an injection measurement of a pilot-main multipulse injection event according to embodiments disclosed herein.
Figure 4:
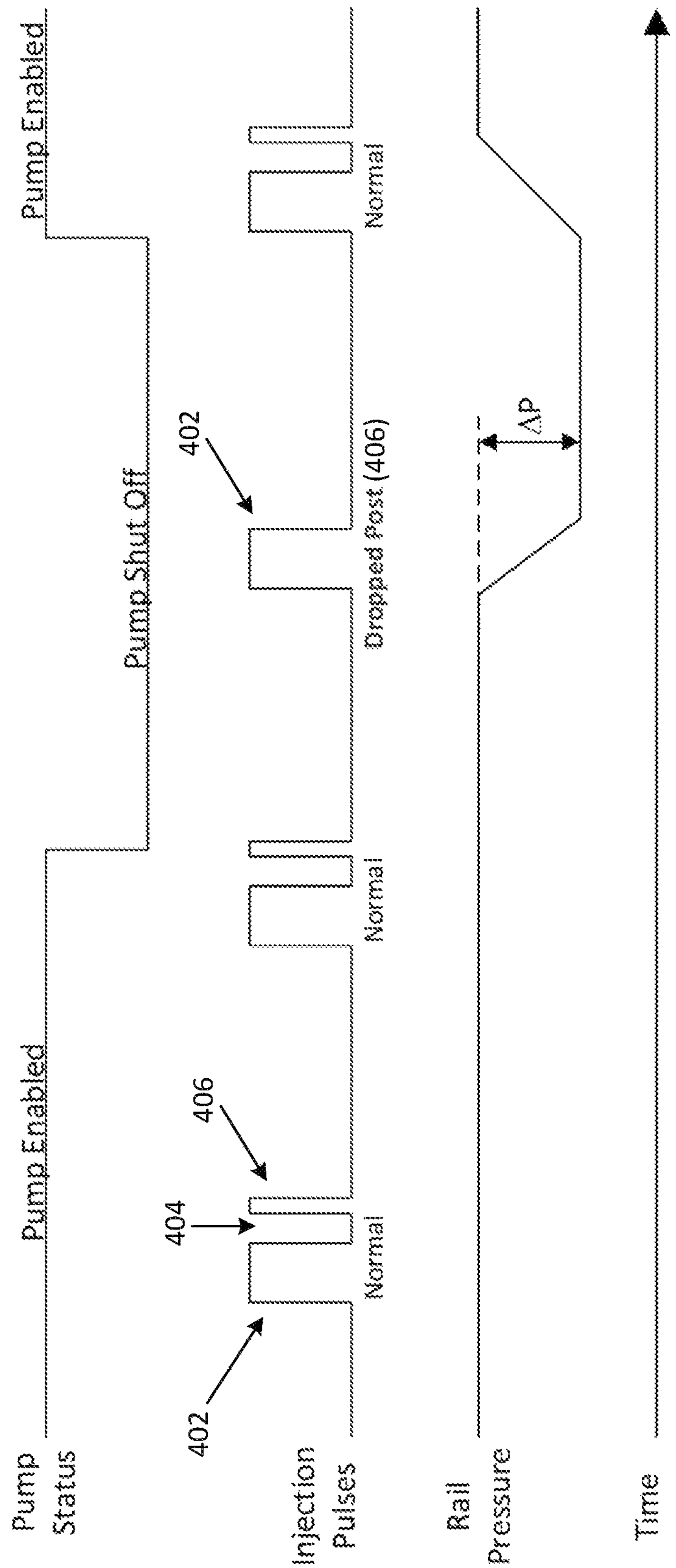
FIG. 4 shows the relationship between pump status, injection pulses, and rail pressure during an injection measurement of a main-post multipulse injection event according to embodiments disclosed herein.
Figure 5:
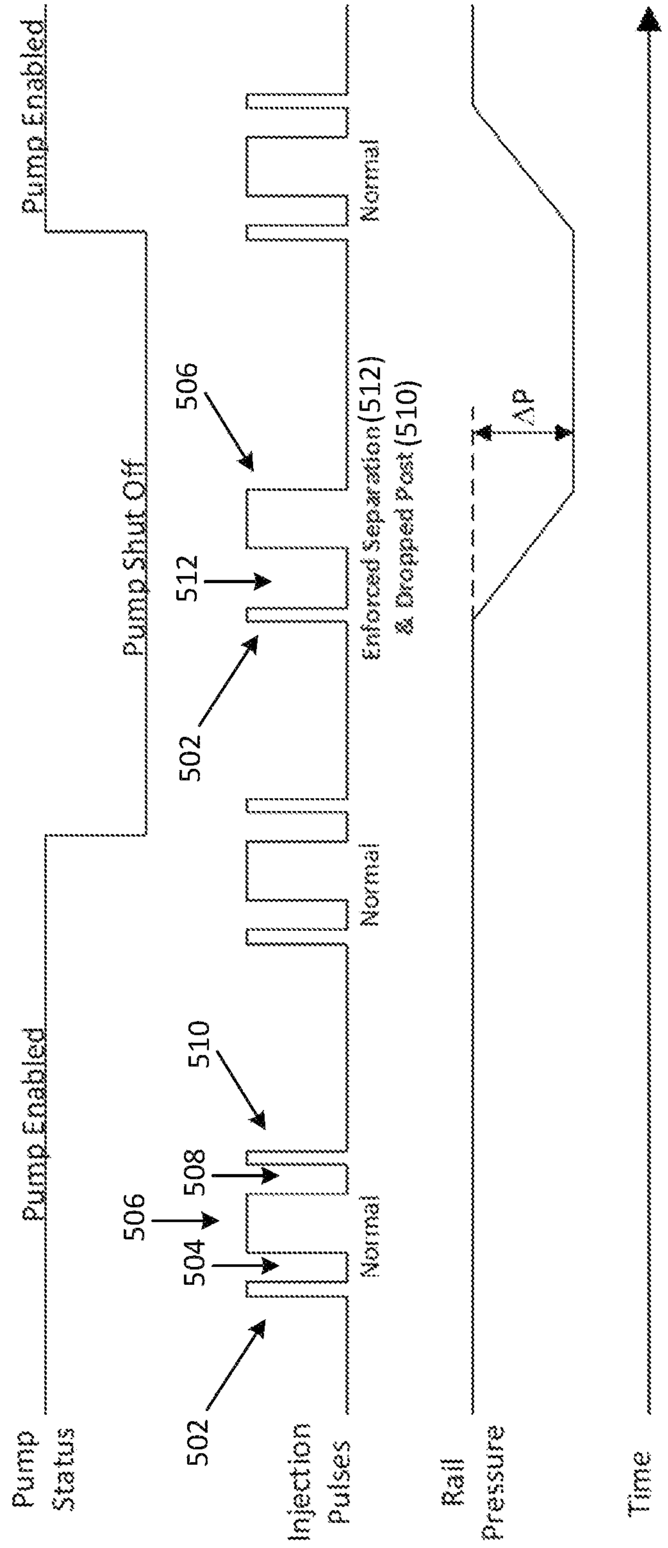
FIG. 5 shows the relationship between pump status, injection pulses, and rail pressure during an injection measurement of a pilot-main-post multipulse injection event according to embodiments disclosed herein.

FIGS. 3 through 5 illustrate the methods as disclosed herein to be implemented in the fuel system 100 to achieve better measurements of injection quantities that are representative of a single-pulse injection during the multipulse injection operation by providing a solution to the problem described above with regards to the prior-art method of FIG. 2.

The solution pertains to specific multipulse combinations involving pilot, main, and post injections. "Pilot" injections are typically small quantities injected prior to the main injection. "Post" injections are relatively small quantities injected after the main injection. The solution addresses two 2-pulse combinations (pilot+main in FIG. 3 and main+post in FIG. 4) and one 3-pulse combination (pilot+main+post in FIG. 5).

For the pilot+main combination shown in FIG. 3, the main injected quantity is measured by temporarily increasing a normal separation 304, thereby forming an increased separation 308 greater than the normal separations 304, between a pilot pulse 302 and a main pulse 306 such that the expected interaction effect is zero, measuring the total pressure drop (ΔP) due to both pulses, and subtracting the pilot contribution assuming that the pilot quantity can be accurately measured using known methods (e.g., by monitoring injection pulses). This process is described by the following equation:

$$Q_{injected} = \frac{V}{c^2}\Delta P - Q_{pilot} - Q_{pilot\_drain} - Q_{main\_drain} \quad \text{(Equation 2)}$$

where V is the value of the total pressurized volume 116 which is constant, c is the effective sonic speed which is a function of pressure and temperature of the system, $Q_{pilot}$ is the commanded pilot quantity for the pilot pulse 302, which is assumed to be accurate, $Q_{pilot\_drain}$ is the drain quantity associated with the commanded pilot quantity, and $Q_{main\_drain}$ is the drain quantity associated with the main pulse 306.

In this method, in order to determine the correct "enforced" separation 308, injectors are tested at various quantities (pilot and main), pressures, and separations. The best enforced separation 308 is determined as the value that results in the quantity of the main pulse 306 being equal to the main quantity 306 that would result if there were no pilot pulse 302 present. This solution assumes that the best enforced separation 308 is insensitive to injector variation and aging effects and that increasing the normal separation 304 for a few cylinder events will not cause an objectionable intrusion on normal engine operation.

FIG. 4 illustrates the method for the main+post combination, where a quantity of a main pulse 402 is measured by temporarily omitting a post pulse 406 during the measurement period. Thus, the measurement situation is equivalent to single-pulse operation. Omitting the post pulse 406 is acceptable when the post pulse 406 is small and occurs after a separation 404 behind the main pulse 402 to contribute little or insignificant torque to the overall combustion event. For example, a common reason for using the post pulse 406 is to reduce smoke. If the post pulse 406 results in an objectionable torque disturbance, it would be possible to increase injection amount of the main pulse 402 to compensate for the loss of the post pulse 406.

For the pilot+main+post combination shown in FIG. 5, the method is applied simultaneously to isolate and measure the quantity of a main pulse 506. That is, a pilot pulse 502, a first normal separation 504, a main pulse 506, a second normal separation 508, and a post pulse 510 are arranged such that there is an enforced separation 512 between the pilot pulse 502 and the main pulse 506 and the post pulse 510 is dropped entirely, thereby also eliminating the second normal separation 508, effectively turning the pilot+main+post combination into a pilot+main combination temporarily while the pump is shut off, as shown.

In all the above techniques shown in FIGS. 3 through 5, the temporary increase of pilot separation (308 or 512) or the temporary omission of post pulse (406 or 510) only affects a few cylinder events out of every thousand or more normal cylinder events. Therefore, it is expected that the impact of any omission is negligible. The fact that such intrusions are relatively infrequent is a consequence of a desire to use pump cutouts sparingly, since the temporary dip in rail pressure may also represent a potential source of increased emissions.

Figure 6:
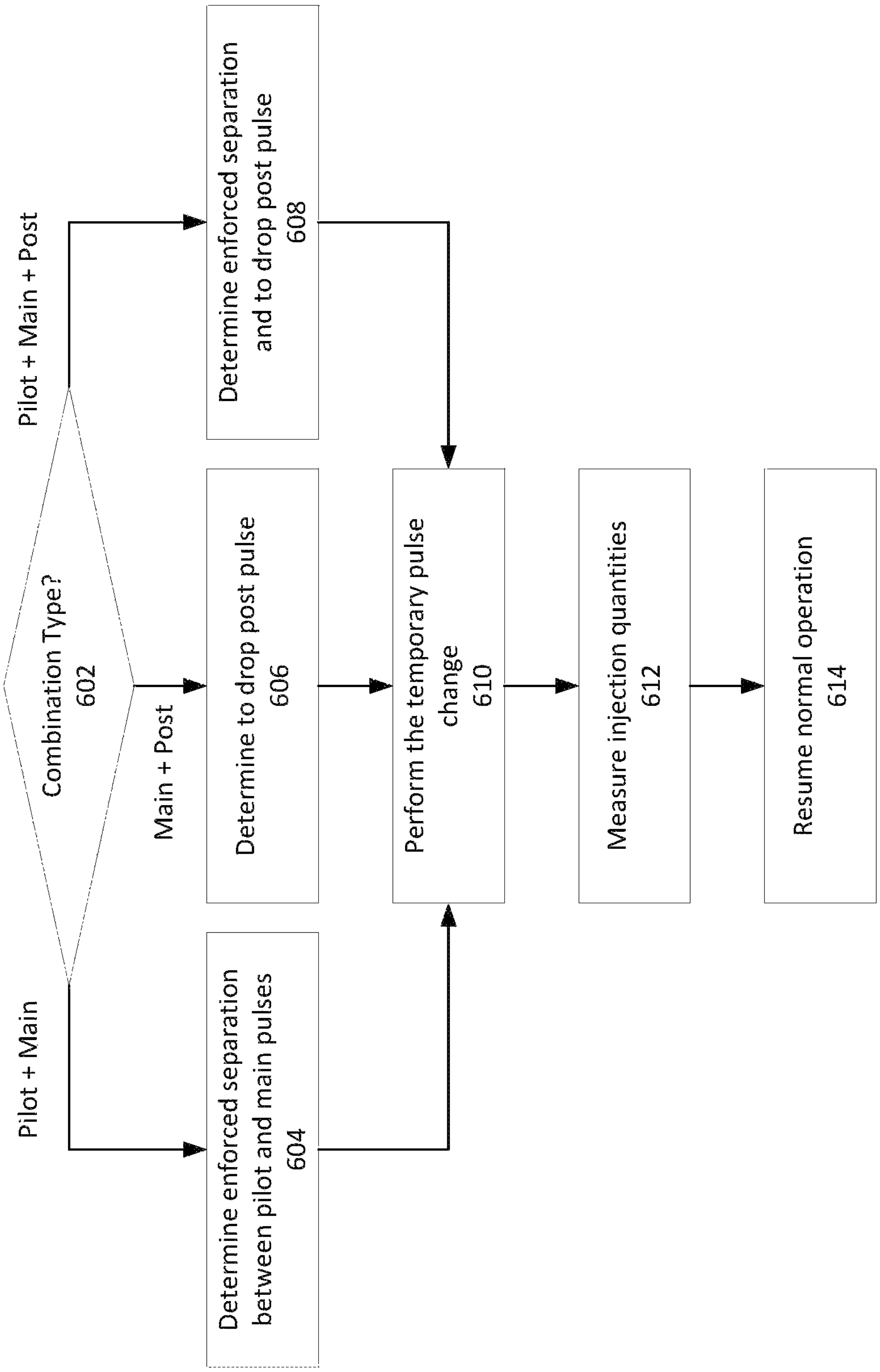
FIG. 6 shows a flow diagram of an intrusion method to perform injection measurement in a common rail fuel system according to embodiments disclosed herein.

FIG. 6 shows an intrusion method 600 (also referred to as an intrusion process, procedure, or algorithm implemented in a control unit) for how the methods shown in FIGS. 3 through 5 operate according to some embodiments to enable accurate measurements of the injection pulses. In step 602, the control unit determines the combination type for the multipulse injection. That is, the control unit determines whether (a) pilot pulse and main pulse, (b) main pulse and post pulse, or (c) pilot pulse, main pulse, and post pulse are implemented in each multipulse injection event under the normal operating condition. It is to be understood that the pilot and post pulses both involve a smaller amount of fuel injection than the main pulse.

If the pilot and main pulses are determined to be implemented in step 602, the control unit proceeds to step 604 to determine an enforced separation between the pilot and main pulses. Refer to FIG. 3 for an example of such enforced separation.

If the main and post pulses are determined to be implemented in step 602, the control unit proceeds to step 606 to determine to drop (or omit) the post pulse, turning it into a single-injection event. Refer to FIG. 4 for an example of such omission of the post pulse.

Otherwise, if the pilot, main, and post pulses are determined to be implemented in step 602, the control unit proceeds to step 608 to determine both an enforced separation and to drop (or omit) the post pulse, turning the pilot-main-post injection event into a pilot-main injection event. Refer to FIG. 5 for an example of such combination of the enforced separation and post pulse omission.

In the aforementioned steps 604 and 608, the control unit can obtain the enforced separation by accessing memory, database, lookup table, or any other suitable form of data storage and lookup. The amount of enforced separation may vary depending on the type of fuel system that is used and the injector design, for example. Offline testing is performed on each type of fuel system or injector design under predetermined operational conditions to determine a set of different enforced separations that would cause minimal interaction between the pilot and main pulses, such that the measurement taken during the multipulse injection event emulates a single-injection pulse event (that is, an injection pulse event that has no interaction from a previous pulse).

In some examples, the enforced separations are precalibrated, a single parameter applicable to a plurality of types of fuel systems or injector designs, or a fixed lookup table as created by the manufacturer of the fuel system or the injectors, for example. As such, in these examples, the control unit does not require a complex data-processing capability to determine which enforced separation to apply.

Thereafter, in step 610, the determined temporary pulse change (according to one of steps 604, 606, and 608) is performed in one multipulse injection event out of a plurality of multipulse injection events. The step 610 involves temporarily shutting off the pumps for a short period of time, and during the short period of time while the pumps are shut off, the temporary pulse change is applied to the multipulse injection event that takes place. In some examples, the short period of time lasts just long enough to perform the temporary pulse change to one multipulse injection event, after which the pump can be turned on or enabled again immediately. For example, such short period of time may last about 20 milliseconds, about 30 milliseconds, about 40 milliseconds, or any other suitable length of time therebetween.

While the change is reflected in the multipulse injection event, in step 612, the control unit measures the injection quantities in each injection event. The measurement of injection quantities can be achieved by measuring the pressure change in the common rail and calculating the injection quantities based on the measured pressure change, for example by using the Equation 1 or 2 as previously mentioned. Furthermore, an injection drain quantity of the pilot pulse and the main pulse can be obtained, which is also used in the calculation of the injection quantities.

Thereafter, in step 614, the temporary pulse changes are halted or stopped, causing the system to resume normal operation. That is, the injection events assume their normal separation and pulses, and the pumps that were shut off are now enabled again.

In some examples, the intrusion method 600 is implemented by the control unit only once every 1000 cylinder events, every 1200 cylinder events, every 1500 cylinder events, every 1700 cylinder events, every 2000 cylinder events, or any other number of cylinder events therebetween. As previously explained, the relative infrequency of the intrusion events caused by the intrusion method 600 enables the impact of such enforced separation and/or pulse omission to be negligible to the overall performance of the system, thereby preventing any adverse effect due to the enforced separation and/or pulse omission.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation.

For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method of measuring an injected fuel quantity during operation of a common rail fuel system including a control unit configured to control a fuel pump to supply fuel to a common rail and to control one or more injectors to inject fuel from the common rail, the method comprising:

operating the one or more injectors according to normal multipulse injection parameters including a normal pilot-pulse to main-pulse separation;

with the fuel pump shut off, operating the one or more injectors according to modified multipulse injection parameters including a modified pilot-pulse to main-pulse separation, the modified pilot-pulse to main-pulse separation being greater than the normal pilot-pulse to main-pulse separation;

sensing a pressure drop of the common rail fuel system during the operating the one or more injectors according to the modified multipulse injection parameters; and after the sensing operating the one or more injectors according to the normal multipulse injection parameters.

2. The method of claim 1, comprising: determining if the normal multipulse injection parameters include a pilot-pulse and a main-pulse.

3. The method of claim 2, comprising: in response to determining that the normal multipulse injection parameters include the pilot-pulse and the main-pulse, obtaining an enforced separation value and applying the enforced separation value to provide the modified pilot-pulse to main-pulse separation.

4. The method of claim 3, wherein the enforced separation value is empirically determined for a plurality of pilot quantities, main quantities, pressures, and separations to provide a main pulse quantity of an amount that would result if there were no pilot pulse present.

5. The method of claim 1, wherein the modified multi-pulse injection parameters emulate a single-pulse injection.

6. The method of claim 1, wherein the operating the one or more injectors according to modified multipulse injection parameters is performed for a subset of a plurality of multipulse injection events.

7. The method of claim 6, wherein the subset comprises a one multipulse injection event in every 1000 or more multipulse injection events.

8. The method of claim 1, comprising:

obtaining an injection drain quantity of the pilot pulse and the main pulse in the common rail; and calculating the injected fuel quantity based on the pressure change in the common rail and the injection drain quantity.

9. The method of claim 1, wherein the normal multipulse injection parameters include a post pulse, and the modified multipulse injection parameters omit the post pulse.

10. The method of claim 9, wherein the modified multi-pulse injection parameters increase an amount of fuel injected by a main pulse to compensate for the temporary omission of the post pulse.

11. A system comprising:

a fuel pump;

a common rail fluidly coupled with the fuel pump and configured to receive fuel from the fuel pump;

one or more fuel injectors fluidly coupled with the common rail and configured to inject the fuel supplied to the common rail by the fuel pump;

an electronic control system operatively coupled with and configured to control operation of the one or more fuel injectors and the fuel pump, the electronic control system being configured to:

operate the one or more injectors according to normal multipulse injection parameters including a normal pilot-pulse to main-pulse separation;

with the fuel pump shut off, operate the one or more injectors according to modified multipulse injection parameters including a modified pilot-pulse to main-pulse separation, the modified pilot-pulse to main-pulse separation being greater than the normal pilot-pulse to main-pulse separation;

sense a pressure drop of the common rail fuel system during the operating the one or more injectors according to the modified multipulse injection parameters; and after the pressure drop is sensed, operate the one or more injectors according to the normal multipulse injection parameters.

12. The system of claim 11, wherein the electronic control system is configured to: determine if the normal multipulse injection parameters include a pilot-pulse and a main-pulse.

13. The system of claim 12, wherein the electronic control system is configured to: in response to a determination that the normal multipulse injection parameters include the pilot-pulse and the main-pulse, obtain an enforced separation value and apply the enforced separation value to provide the modified pilot-pulse to main-pulse separation.

14. The system of claim 13, wherein the enforced separation value is empirically determined for a plurality of pilot quantities, main quantities, pressures, and separations to provide a main pulse quantity of an amount that would result if there were no pilot pulse present.

15. The system of claim 11, wherein the modified multipulse injection parameters emulate a single-pulse injection.

16. The system of claim 11, wherein the electronic control system is configured to operate the one or more injectors according to the modified multipulse injection parameters for a subset of a plurality of multipulse injection events.

17. The system of claim 16, wherein the subset comprises a one multipulse injection event in every 1000 or more multipulse injection events.

18. The system of claim 11, wherein the electronic control system is configured to:

obtain an injection drain quantity of the pilot pulse and the main pulse in the common rail; and calculate the injected fuel quantity based on the pressure change in the common rail and the injection drain quantity.

19. The system of claim 11, wherein the normal multipulse injection parameters include a post pulse, and the modified multipulse injection parameters omit the post pulse.

20. The system of claim 19, wherein the modified multipulse injection parameters increase an amount of fuel injected by a main pulse to compensate for the temporary omission of the post pulse.

* * * * *